Patented Aug. 21, 1928.

1,681,379

UNITED STATES PATENT OFFICE.

YOSHITARO TAKAYAMA, OF KOISHIKAWA KU, TOKYO, JAPAN, ASSIGNOR TO SABURO-SUKE SUZUKI, OF TOKYO, JAPAN.

METHOD OF COLLECTING INORGANIC POTASSIUM SALT, BETAIN SALT, AND GLUTAMIC ACID FROM THE WASTE LIQUOR PRODUCED IN DISTILLING ALCOHOL FROM FERMENTED BEET MOLASSES.

No Drawing. Application filed January 12, 1927. Serial No. 160,783.

The present invention relates to the treatment of waste liquor produced in distilling alcohol from fermented beet molasses to obtain potassium salt, betain salt, and glutamic acid therefrom. The process in brief consists in removing yeast and uncrystallizable substances from the waste liquor by dialysis, recovering potassium salt as potassium chloride or potassium sulphate by concentrating the dialyzed liquor and adding the proper quantity of hydrochloric acid or sulphuric acid thereto; recovering the crude glutamic acid hydrochloride containing potassium salt, betain salt, etc. by adding hydrochloric acid to the mother liquor of betain salt and heating same, thereby converting glutimic acid into glutamic acid hydrochloride, and separating impure matters therefrom as humus. The object of the invention is to obtain by this process potassium salt, betain salt and glutamic acid economically from a waste liquid considered generally useless.

The waste liquor of beet molasses is known to contain potassium, betain, glutimic and glutamic acids, but, as it contains a large quantity of uncrystallizable substances it has heretofore been very difficult to economically recover them.

In my process the yeast and uncrystallizable substances are first removed from the waste liquor of alcohol-distilled beet molasses preferably by passing it through suitable parchment paper; then the dialyzed liquor is concentrated, and then the proper quantity of hydrochloric or sulphuric acid is added thereto. This produces crystals of potassium chloride or potassium sulphate which crystals are separated from the liquor by filtration and the remaining liquor is again concentrated and some of the potassium salt and the betain salt which remain in the liquor are crystallized and separated from the liquor. I then add hydrochloric acid to the remaining mother liquor, and heat same sufficiently to convert the glutimic acid therein into glutamic acid. Organic impure matters which hinder crystallization are converted into humus-like substances by heating the same in the presence of hydrochloric acid, and then they are removed by filtration or otherwise. The liquor is then concentrated, and left to cool; finally thick hydrochloric acid is added thereto, or gaseous hydrochloric acid is passed therethrough and the treated liquor left alone until the glutamic acid hydrochloride is crystallized together with any betain salt and potassium salt that may still remain in the liquor. The crystals are finally separated by filtration.

The crude glutamic acid hydrochloride thus obtained is dissolved in water and treated with lime to separate glutamic acid therefrom in the form of dicalcium glutamate.

When the dialyzed liquor is concentrated and sulphuric acid added thereto, calcium hydroxide or calcium carbonate may also be added to the mother liquor to precipitate excess sulphuric acid as calcium sulphate. Thereafter the liquor is treated, as before explained to separate the betain salt and glutamic acid hydrochloride therefrom.

In my process a large part of the yeast, proteids and other uncrystallizable substances contained in the raw waste liquors is removed therefrom by dialysis. The potassium chloride or potassium sulphate crystals are obtained by permitting the warm liquor after treatment as described to cool. Much of the glutamic acid exists in the form of glutimic acid, which crystallizes more slowly than potassium chloride, potassium sulphate or betain salt. Therefore, although the greater part of potassium and betain salt is removed in the early part of the process as above described, as crystals, glutamic acid or glutimic acid remains in the mother liquor. When the glutimic acid is converted into glutamic acid as above described glutamic acid hydrochloride, more or less impure, crystallizes out of the solution in definite quantity; and the process can be practiced simply and economically.

The following is an example of carrying this invention into practice: The waste liquor is first passed through a diffusing apparatus divided into numerous chambers by diaphragms, arranged in such a manner that the alternate chambers are respectively filled with the waste liquor and fresh water which flows therethrough, the liquor being dialyzed in the well known manner. Preferably the temperature of the diffusing apparatus, raw material and water is about 40–70° C. to accelerate the dialysis. The separated dialyzed liquor is then concentrated into a thick liquor. Somewhat more than enough hydrochloric acid to combine with the basic substance contained in the liquor (such as potassium, soda and betain,) is added to the liquor and the mixture cooled. Much of the potassium chloride will crystallize and should be separated by filtering and the remaining liquor again concentrated. A large part of betain chloride and potassium chloride will then crystallize and may be separated from the liquor—washed with warm water and refined.

To the remaining mother liquor (from which betain and potassium salt crystals have been removed) hydrochloric acid (nearly equal in quantity to that previously used) should be added and the mixture heated in a suitable container under pressure for one to two hours; then impurities which hinder crystallization are first converted into humus-like substances, which are then filtered; then concentrate the mixture adding a small quantity of concentrated hydrochloric acid, or passing gaseous hydrochloric acid therethrough if necessary, and allow it to remain quiescent until the crude glutamic acid hydrochloride containing a little quantity of potassium chloride and betain chloride crystallizes. These crystals may then be separated and refined or may be separated from potassium chloride and betain as insoluble dicalcium glutamate.

Although the quantity of the product obtained by the above method varies according to the quality of the raw waste liquor material, the quantity dialyzed out of the alcohol-distilled waste liquor is ordinarily about 75 to 90 per cent. The following percentages of potassium salt, betain and glutamic acid have been produced:

| | Per cent. |
|---|---|
| Potassium chloride | 12 |
| Glutamic acid | 6 |
| Betain chloride | 9 |

When sulphuric acid is used as the acid for treating the raw material, add chamber sulphuric acid to the dialyzed liquor in lieu of hydrochloric acid. Filter the potassium sulphate thus crystallized, add hydrochloric acid to the said liquor, from which the excess of sulphuric acid converted into calcium sulphate by slaked lime is removed, and then heat it in the manner above stated.

As uncrystallizable substances and yeast are first removed by dialysis from the waste liquor, the remaining impurities which turn into humus-like substances are minute. This not only lessens the quantity of acid required but also enhances the crystallization and re-separation of the salts.

Also it is not necessary to heat and evaporate the liquor after neutralization and the potassium salt can crystallize directly.

Further by avoiding excess of acid the separation of potassium salt and betain salt is facilitated.

I claim:

1. The herein described process of recovering glutamic acid, potassium salt and betain from the waste liquor produced in distilling alcohol from fermented beet molasses, consisting in first removing yeast and uncrystallizable substances by dialyzing the waste liquor, then collecting potassium salt and betain salt by concentrating the dialyzed liquor and adding mineral acid thereto, then converting the glutimic acid into glutamic acid by adding excess of the mineral acid to the remaining mother liquor and heating the same.

2. The herein described process of treating the waste liquor produced in distilling alcohol from fermented beet molasses, consisting in removing yeast and coarse uncrystallizable matters from the waste liquor by dialyzing, then separating large part of potassium chloride and betain hydrochloride as crystals from the solution of the raw material refined, adding hydrochloric acid to the remaining liquor, heating the same under pressure and thus converting the impure matters which hinder its crystallization into humus-like substance and at the same time glutimic acid into glutamic acid to collect the same in the form of glutamic acid hydrochloride.

3. The herein described method of treating the waste liquor produced in distilling alcohol from fermented beet molasses, consisting in dialyzing the liquor, adding sulphuric acid to the dialyzed liquor to crystallize potassium sulphate, then filtering it and adding lime thereto to precipitate sulphuric acid in the form of calcium sulphate, then adding excess of hydrochloric acid to the mother liquor and then heating the same to separate glutamic acid hydrochloride under pressure, as set forth.

4. The herein described process of treating the waste liquor produced in distilling alcohol from molasses; consisting in first removing coarse yeast and uncrystallizable substances from the waste liquor, then concentrating the liquor and adding mineral acid thereto and separating the crystallized potassium salt betain salts, then adding mineral acid to the remaining mother liquor and heating the same to convert the glutimic acid into glutamic acid and separating the glutamic acid.

In testimony whereof I have affixed my signature.

YOSHITARO TAKAYAMA.